(12) United States Patent
Bunn et al.

(10) Patent No.: US 9,251,262 B1
(45) Date of Patent: Feb. 2, 2016

(54) IDENTIFYING MEDIA QUERIES

(71) Applicant: Google Inc., Mountain View, CA (US)

(72) Inventors: Paul Bunn, Mountain View, CA (US); Ashutosh Shukla, Mountain View, CA (US); Shashidhar Anil Thakur, Saratoga, CA (US); Subramaniam Ganapathy, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/317,074

(22) Filed: Jun. 27, 2014

Related U.S. Application Data

(63) Continuation of application No. 13/446,646, filed on Apr. 13, 2012, now Pat. No. 8,768,910.

(51) Int. Cl.
*G06F 17/00* (2006.01)
*G06F 17/30* (2006.01)

(52) U.S. Cl.
CPC .................. *G06F 17/30864* (2013.01)

(58) Field of Classification Search
None
See application file for complete search history.

(56) References Cited

U.S. PATENT DOCUMENTS

| | | | |
|---|---|---|---|
| 7,831,588 B2 | 11/2010 | Jones et al. | |
| 7,832,588 B2 * | 11/2010 | Suzuki | G03B 17/02 220/475 |
| 8,005,826 B1 * | 8/2011 | Sahami et al. | 707/723 |
| 8,533,761 B1 | 9/2013 | Sahami et al. | |
| 8,583,653 B2 * | 11/2013 | Collins | G06F 17/30457 707/696 |
| 8,620,910 B2 * | 12/2013 | Shiraishi | G06F 17/30867 707/728 |
| 8,768,910 B1 | 7/2014 | Bunn et al. | |
| 8,903,843 B2 * | 12/2014 | Farrelly | 707/767 |
| 2009/0043749 A1 | 2/2009 | Garg et al. | |
| 2009/0077047 A1 * | 3/2009 | Cooper et al. | 707/4 |
| 2009/0144168 A1 | 6/2009 | Grouf et al. | |
| 2009/0198672 A1 | 8/2009 | Jones et al. | |
| 2009/0299964 A1 | 12/2009 | Cameron et al. | |
| 2010/0094854 A1 * | 4/2010 | Rouhani-Kalleh | 707/706 |
| 2010/0114908 A1 | 5/2010 | Chand et al. | |
| 2010/0138402 A1 | 6/2010 | Burroughs et al. | |
| 2010/0306193 A1 | 12/2010 | Pereira et al. | |
| 2011/0004592 A1 | 1/2011 | Shiraishi | |
| 2011/0184951 A1 | 7/2011 | Paparizos et al. | |
| 2011/0282881 A1 | 11/2011 | Collins et al. | |
| 2012/0047571 A1 * | 2/2012 | Duncan | H04L 63/0245 726/13 |
| 2012/0117051 A1 | 5/2012 | Liu et al. | |
| 2012/0130969 A1 | 5/2012 | Wong et al. | |
| 2012/0150850 A1 | 6/2012 | Parthasarathy et al. | |
| 2012/0158713 A1 * | 6/2012 | Jin | G06F 17/30029 707/728 |
| 2012/0166438 A1 | 6/2012 | Wu et al. | |
| 2013/0097156 A1 | 4/2013 | Nagaralu et al. | |

\* cited by examiner

*Primary Examiner* — Hung Le
(74) *Attorney, Agent, or Firm* — Middleton Reutlinger

(57) ABSTRACT

A computer device obtains a search query; obtains product search results based on the search query and a products search index that includes information regarding documents associated with products; determines a category associated with a set of result of the product search results; identifies candidate queries for the search query; determines whether the category matches one of the candidate queries; identifies that the search query is associated with a type of media identified by the category when the category matches one of the candidate queries; and provides, in response to identifying that the search query is associated with the type of media, a result document based on the type of media.

20 Claims, 13 Drawing Sheets

IDENTIFYING MEDIA QUERIES

RELATED APPLICATION

This application is a continuation of U.S. application Ser. No. 13/446,646, filed Apr. 13, 2012 (now U.S. Pat. No. 8,768,910). The entire disclosure of which is incorporated herein by reference.

BACKGROUND

Users use search engines to find information of interest, including information associated with media items, such as television (TV) shows, movies, books, video games, etc. A search query that is submitted to a web search engine interface can be related to a particular type of media item.

SUMMARY

According to one aspect, a method may include: obtaining, by at least one of one or more computing devices, a search query; identifying, by at least one of the one or more computing devices, search results based on the search query and a products search index that includes information regarding documents associated with products; obtaining, by at least one of the one or more computing devices, a category associated with a set of results of the search results; identifying, by at least one of the one or more computing devices, candidate queries for the search query; determining, by at least one of the one or more computing devices, whether the category matches one of the candidate queries; identifying, by at least one of the one or more computing devices, that the search query is associated with a type of media identified by the category when the category matches one of the candidate queries; and providing, by at least one of the one or more computing devices and in response to identifying that the search query is associated with the type of media, a result document based on the type of media.

According to another aspect, a system may include one or more devices. The one or more devices may obtain a search query; obtain search results based on the search query and a products search index that includes information regarding documents associated with products; determine a category associated with a set of results of the search results; identify candidate queries for the search query; determine whether the category matches one of the candidate queries; identify the search query as a media query associated with the category when the category matches the one of the candidate queries; and provide a result document based on the media query and in response to identifying the search query as the media query.

According to yet another aspect, a system may include a memory and one or more processors. The memory may store a keyword list associated with a category of media items. The one or more processors may obtain a search query; identify candidate queries for the search query; determine whether the candidate queries match words in the keyword list; identify the search query as a media query associated with the category when the candidate queries match one or more of the words in the keyword list; and provide, in response to identifying the search query as the media query, a result document based on the media query.

BRIEF DESCRIPTION OF THE DRAWINGS

The accompanying drawings, which are incorporated in and constitute a part of this specification, illustrate some implementations described herein and, together with the description, explain these implementations. In the drawings.

DETAILED DESCRIPTION

The following detailed description refers to the accompanying drawings. The same reference numbers in different drawings may identify the same or similar elements.

Systems and/or methods, as described herein, may identify a query as a media query. For example, a computer device may create a list of keywords that is used to determine whether a query is associated with a particular category of media items, such as movies. The computer device may receive a query, and may identify product search results based on the query and a products search index that includes information regarding documents associated with products. The computer device may further identify candidate queries. In some implementations, the candidate queries may include terms that are suggested for the search query when the search query is entered using a web search engine interface. In some implementations, the candidate queries may include refinements that are added by users to the search query shortly, e.g., within a particular number of seconds, after the users initially enters and submits the search query. In some implementations, the candidate queries may include terms that are added to a search query after the search query is entered and submitted, including, for example, synonyms of one or more terms that are included in the search query. The computer device may identify the query as a media query of a type associated with the particular category of media items when one or more of the candidate queries match one or more keywords in the list of keywords. As a result, when the query is identified as the media query, the computer device may output a specialized document, which includes, for example, links to purchase products of the type associated with the particular category of media items.

A specialized search engine, such as a products search engine component that is described further below, may refer to any search engine that allows users to search for a particular type of information, such as product-related information, image-related information, video-related information, news-related information, etc. When a query is submitted to the specialized search engine, the specialized search engine may retrieve results, for the query, from a specialized index that includes entries, which are all associated with a particular type of information.

In the description to follow, a specialized search engine will often be described in the context of a products search engine. It should be understood, however, that the description applies to other types of information. Furthermore, in the description to follow, methods and/or systems will be described in the context of media items. It should be understood, however, that the description applies to other types of items and/or products. For example, similar methods and/or systems may be used to identify a query as another type of query, such as a news query, a people query, etc.

Figure 1A:
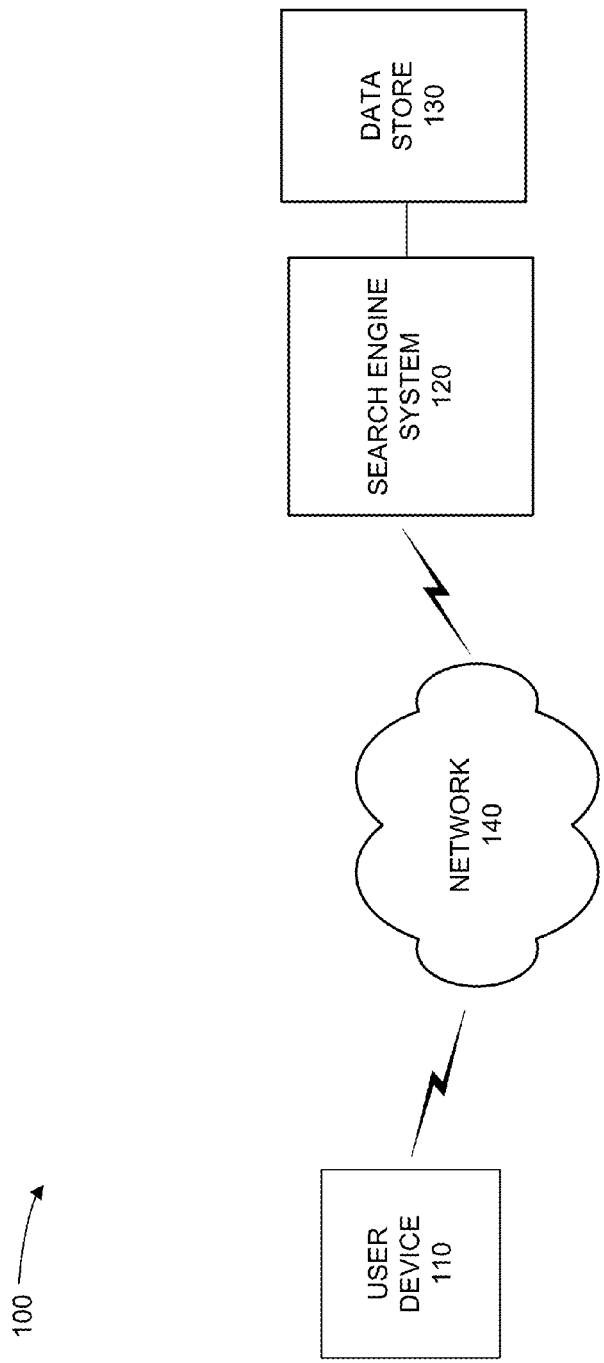
FIGS. 1A and 1B are diagrams of an example environment in which systems and/or methods described herein may be implemented.
Figure 1B:
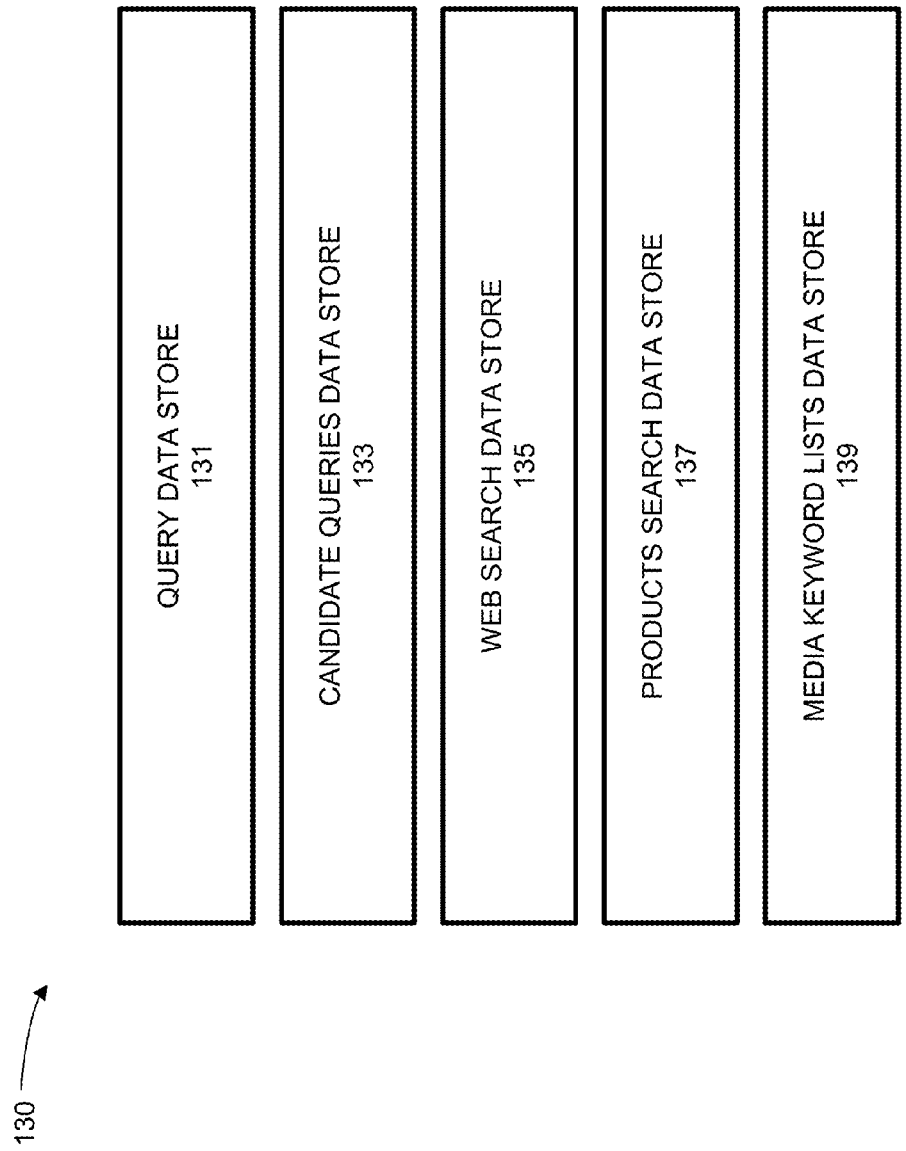

FIGS. 1A and 1B are diagrams of an example environment 100 in which systems and/or methods described herein may be implemented. As shown in FIG. 1A, environment 100 may include a user device 110, a search engine system 120, a data store 130, and a network 140. In practice, environment 100 may include additional systems/devices, fewer systems/devices, different systems/devices, or differently arranged systems/devices than are shown in FIG. 1A. In some implementations, one or more of the systems/devices of environment 100 may perform one or more functions described as being performed by another one or more of the systems/devices of environment 100.

Furthermore, two or more of the systems/devices, of FIG. 1A, may be implemented within a single device, or a single system/device may be implemented as multiple, distributed devices. Also, systems/devices of environment 100 may interconnect through wired and/or wireless connections. In other words, any two systems/devices, of environment 100, may communicate through a wired connection, a wireless connection, or a combination of a wired connection and a wireless connection.

User device 110 may include a computation and/or a communication device, such as a communication device that is capable of communicating, through network 140, with search engine system 120. In some implementations, user device 110 may take the form of a web service terminal, a personal computer, a laptop, a tablet computer, a handheld computer, a smart phone, a mobile telephone device, a personal digital assistant (PDA), a personal media player, a set-top box (STB) connected to a video display device, such as a television, or any other type of computation or communication device capable of transmitting data to, for example, search engine system 120. In some implementations, user device 110 may represent multiple devices operated by a user, including, for example, a personal computer and a mobile device.

Search engine system 120 may include one or more server devices and/or one or more computer systems that process, search, and/or index documents that are available on a network, such as the Internet. Search engine system 120 may allow users to search for particular documents by submitting search queries to search engine system 120. Search system 120 may further include one or more server devices and/or one or more computer systems that allow users to search for particular types of information, such as product-related information, images, news-related information, etc.

Data store 130 may include one or more storage devices and/or computer systems that store information that is provided by search engine system 120 to data store 130. Search engine system 120 may access and/or retrieve information from data store 130.

As shown in FIG. 1B, data store 130 may include a query data store 131, a candidate queries data store 133, a web search data store 135, a products search data store 137, and/or media keyword lists data store 139. Although FIG. 1B shows example data stores of data store 130, data store 130 may include fewer data stores, different data stores, and/or additional data stores.

Query data store 131 may include information associated with search queries that are received by search engine system 120, including search queries that are submitted to a web search engine interface, a products search engine interface, and/or one or more other specialized search engine interfaces. Candidate queries data store 133 may include candidate queries for different search queries. The candidate queries may include words that would be suggested, by search engine system 120, to be added by a user to a search query if the user were to enter the search query into a web search engine interface of search engine system 120. In some implementations, query data store 131 may be anonymized.

Web search data store 135 may include a web search index, described further below. Products search data store 137 may include a products search index, and/or types/categories of products that are associated with the products that are included in the products search index. The products search index may include information regarding documents associated with products, as described further below. Media keyword lists data store 139 may include keyword lists for different media categories, as described further below with reference to FIG. 3.

In some implementations, search engine system 120 may include a crawler component, an indexer component, and/or a search engine component. The crawler component may access, fetch, index, search, and/or maintain documents. The crawler component may implement a data aggregation service by crawling a corpus of documents, such as web pages, hosted by various web servers.

A document may refer to any machine-readable and machine-storable work product. A document may include, for example, an e-mail, a website, a business listing, a file, a combination of files, one or more files with embedded links to other files, a news group posting, a blog, an advertisement, an image, a video, a digital map, an audio clip, etc. In the context of the Internet, a document may refer to a web page. Documents may include textual information, embedded information, such as meta information, images, hyperlinks, etc., and/or embedded instructions, such as Javascript, etc.

The indexer component may index the documents to create the web search index of web search data store 135. In some implementations, the indexer may extract text from the content of the crawled document, extract individual terms or other data from the text, and sort those terms or other data into the web search index. In some implementations, the indexer may index the documents by using other standard indexing techniques.

The search engine component may provide a web page with a web search engine interface for search engine system 120. The search engine component may receive a query, entered into the web search engine interface, from user device 110. The search engine component may search the web search index for specific documents whose content is responsive to the query. The search engine component may generate results associated with the specific documents. The search engine component may provide the results to user device 110. User device 110 may display the results in, for example, a browser window. Each one of the results may include an address associated with a document, a snippet of content extracted from the document, and/or other information associated with the document and/or the address.

In some implementations, search engine system 120 may further include a submission component and a products search engine component. The submission component may receive information from on-line merchants and/or third parties about an item and an address that a user of user device 110 may use to access a document, such as a web page, associated with the item. In the product context, for example, the information about the item may include, for example, an identifier of a product, a brand of the product, a type of the product, a price of the product, terms associated with the product, etc. In the media item context, for example, information about a media item may include a title associated with the media item, a media category associated with the media item, etc. In some implementations, search engine system 120 may include a crawler component that accesses, fetches, indexes, and/or searches documents that are maintained by merchants of products, such as web pages of web sites of on-line retailers. The crawler component may obtain same type of information about items as received by the submission component that is described above.

Search engine system 120 may create an entry for an address in the products search index of products search data store 137, based on the address and information associated with the address. The products search index may include entries that store information about products and corresponding addresses that a user may use to access documents associated with the products.

The products search engine component may receive a product-related query from user device 110. The products search engine component may search the products search index, based on the received product-related query, to match terms of the product-related query with terms associated with entries in the products search index. The products search engine component may generate results, which correspond to product-related documents that are responsive to the product-related query. The products search engine component may provide the results to user device 110.

In some implementations, search engine system 120 may also include a processing component that is capable of identifying a search query as media query or a possible media query. The processing component may retrieve information from query data store 131, candidate queries data store 133, and/or products search data store 137 in order to form keyword lists, associated with different media categories, of media keyword lists data store 139.

The processing component may receive a search query submitted to search engine system 120. The processing component may retrieve product results, for the search query, from the products search index of products search data store 137 and/or candidate queries, for the search query, from candidate queries data store 133. The processing component may determine whether the query is a media query, of a type associated with one of the different media categories, based on one of the keyword lists, the specialized results, the candidate queries, and/or one or more other types of information.

Figure 2:
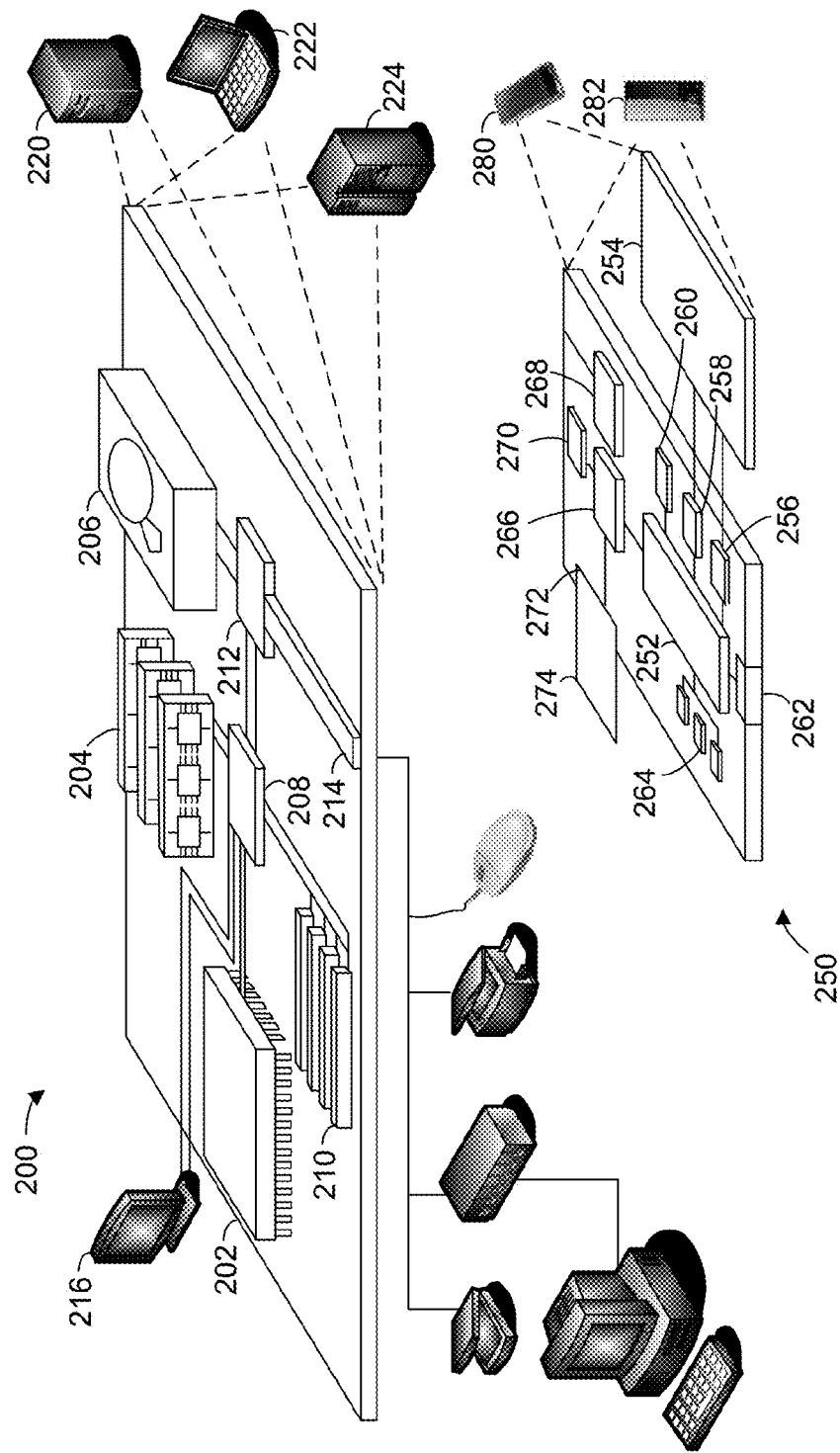
FIG. 2 illustrates an example of a computing device and a mobile computing device.

FIG. 2 is a diagram that shows an example of a computing device 200 and a mobile computing device 250, which may be used with the techniques described herein. Computing device 200 may correspond to, for example, user device 110, search engine system 120, and/or data store 130. Mobile computing device 250 may correspond to, for example, user device 110.

Computing device 200 is intended to represent various forms of digital computers, such as laptops, desktops, workstations, personal digital assistants, servers, blade servers, mainframes, and other appropriate computers. Mobile computing device 250 is intended to represent various forms of mobile devices, such as personal digital assistants, cellular telephones, smart phones, and other similar computing devices. The components shown here, their connections and relationships, and their functions, are meant to be examples only, and are not meant to limit implementations described and/or claimed in this document.

Computing device 200 may include a processor 202, memory 204, a storage device 206, a high-speed interface 208 connecting to memory 204 and high-speed expansion ports 210, and a low speed interface 212 connecting to low speed bus 214 and storage device 206. Each of the components 202, 204, 206, 208, 210, and 212, may be interconnected using various busses, and may be mounted on a common motherboard or in other manners as appropriate. Processor 202 may process instructions for execution within computing device 200, including instructions stored in the memory 204 or on storage device 206 to display graphical information for a graphical user interface (GUI) on an external input/output device, such as display 216 coupled to high speed interface 208. In some implementations, multiple processors and/or multiple buses may be used, as appropriate, along with multiple memories and types of memory. Also, multiple computing devices 200 may be connected, with each device providing portions of the necessary operations, such as a server bank, a group of blade servers, or a multi-processor system, etc.

Memory 204 may store information within computing device 200. In some implementations, memory 204 may include a volatile memory unit or units. In some implementations, memory 204 may include a non-volatile memory unit or units. Memory 204 may also be another form of computer-readable medium, such as a magnetic or optical disk. A computer-readable medium may be defined as a non-transitory memory device. A memory device may include memory space within a single physical memory device or spread across multiple physical memory devices.

Storage device 206 may provide mass storage for computing device 200. In some implementations, storage device 206 may include a computer-readable medium, such as a floppy disk device, a hard disk device, an optical disk device, or a tape device, a flash memory or other similar solid state memory device, or an array of devices, including devices in a storage area network or other configurations. A computer program product may be tangibly embodied in an information carrier. The computer program product may also contain instructions that, when executed, perform one or more methods, such as those described below. The information carrier may include a computer or machine-readable medium, such as memory 204, storage device 206, or memory included within processor 202.

High speed controller 208 may manage bandwidth-intensive operations for computing device 200, while low speed controller 212 may manage lower bandwidth-intensive operations. Such allocation of functions is an example only. In some implementations, high-speed controller 208 may be coupled to memory 204, display 216, and to high-speed expansion ports 210, which may accept various expansion cards. In some implementations, low-speed controller 212 may be coupled to storage device 206 and to low-speed expansion port 214. Low-speed expansion port 214, which may include various communication ports, such as USB, Bluetooth, Ethernet, wireless Ethernet, etc., may be coupled to one or more input/output devices, such as a keyboard, a pointing device, a scanner, or a networking device, such as a switch or router, e.g., through a network adapter.

Computing device 200 may be implemented in a number of different forms, as shown in FIG. 2. For example, it may be implemented as a standard server 220, or multiple times in a group of such servers. It may also be implemented as part of a rack server system 224. Additionally or alternatively, computing device 200 may be implemented in a personal computer, such as a laptop computer 222. Additionally or alternatively, components from computing device 200 may be combined with other components in a mobile device, such as mobile computing device 250. Each of such devices may contain one or more of computing device 200, mobile computing device 250, and/or an entire system may be made up of multiple computing devices 200 and/or mobile computing devices 250 communicating with each other.

Mobile computing device 250 may include a processor 252, a memory 264, an input/output (I/O) device such as a display 254, a communication interface 266, and a transceiver 268, among other components. Mobile computing device 250 may also be provided with a storage device, such as a microdrive or other device, to provide additional storage. Each of components 250, 252, 264, 254, 266, and 268, may be interconnected using various buses, and several of the components may be mounted on a common motherboard or in other manners as appropriate.

Processor 252 may execute instructions within mobile computing device 250, including instructions stored in memory 264. Processor 252 may be implemented as a set of chips that may include separate and multiple analog and/or digital processors. Processor 252 may provide, for example, for coordination of the other components of mobile computing device 250, such as, for example, control of user interfaces, applications run by mobile computing device 250, and/or wireless communication by mobile computing device 250.

Processor 252 may communicate with a user through control interface 258 and a display interface 256 coupled to a display 254. Display 254 may include, for example, a Thin-Film-Transistor Liquid Crystal Display (TFT LCD), an Organic Light Emitting Diode (OLED) display, and/or other appropriate display technology. Display interface 256 may comprise appropriate circuitry for driving display 254 to present graphical and other information to a user. Control interface 258 may receive commands from a user and convert them for submission to processor 252. In addition, an external interface 262 may be provide in communication with processor 252, so as to enable near area communication of mobile computing device 250 with other devices. External interface 262 may provide, for example, for wired communication and/or wireless communication, and multiple interfaces may also be used.

Memory 264 may store information within mobile computing device 250. Memory 264 can be implemented as one or more of a computer-readable medium or media, a volatile memory unit or units, or a non-volatile memory unit or units. Expansion memory 274 may also be provided and connected to mobile communication device 250 through expansion interface 272, which may include, for example, a Single In Line Memory Module (SIMM) card interface. Such expansion memory 274 may provide extra storage space for mobile computing device 250, or may also store applications or other information for mobile computing device 250. Specifically, expansion memory 274 may include instructions to carry out or supplement the processes described above, and may also include secure information. Thus, for example, expansion memory 274 may be provided as a security module for mobile computing device 250, and may be programmed with instructions that permit secure use of mobile computing device 250. In addition, secure applications may be provided through SIMM cards, along with additional information, such as placing identifying information on a SIMM card in a non-hackable manner.

Memory 264 and/or expansion memory 274 may include, for example, flash memory and/or NVRAM memory, as discussed below. In some implementations, a computer program product may be tangibly embodied in an information carrier. The computer program product may store instructions that, when executed, perform one or more methods, such as those described above. The information carrier may correspond to a computer- or machine-readable medium, such as the memory 264, expansion memory 274, or memory included within processor 252, that may be received, for example, over transceiver 268 or over external interface 262.

Mobile computing device 250 may communicate wirelessly through a communication interface 266, which may include digital signal processing circuitry where necessary. Communication interface 266 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 268. In addition, short-range communication may occur, such as using a Bluetooth, WiFi, or other such transceiver. In addition, a Global Positioning System (GPS) receiver module 270 may provide additional navigation- and location-related wireless data to mobile computing device 250, which may be used as appropriate by applications running on mobile computing device 250.

Mobile computing device 250 may also communicate audibly using an audio codec 260, which may receive spoken information from a user and convert it to usable digital information. Audio codec 260 may likewise generate audible sound for a user, such as through a speaker, e.g., in a handset of mobile computing device 250. Such sound may include sound from voice telephone calls, may include recorded sound, such as voice messages, music files, etc., and may also include sound generated by applications operating on mobile computing device 250.

Mobile computing device 250 may be implemented in a number of different forms, as shown in FIG. 2. For example, it may be implemented as a cellular telephone 280. It may also be implemented as part of a smart phone 282, a personal digital assistant, and/or other similar mobile device.

Various implementations of the systems and techniques described herein may be realized in digital electronic circuitry, integrated circuitry, specially designed application specific integrated circuits (ASICs), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs, also known as programs, software, software applications or code, may include machine instructions for a programmable processor, and may be implemented in a high-level procedural and/or object-oriented programming language, and/or in assembly/machine language. As used herein, the terms "machine-readable medium" "computer-readable medium" may refer to any computer program product, apparatus, and/or device used to provide machine instructions and/or data to a programmable processor. The computer program product, apparatus, and/or device may include, for example, magnetic discs, optical disks, memory, Programmable Logic Devices (PLDs).

To provide for interaction with a user, the systems and techniques described herein may be implemented on a computer having a display device for displaying information to the user and a keyboard and a pointing device, such as a mouse or a trackball, by which the user can provide input to the computer. Other kinds of devices may be used to provide for interaction with a user as well; for example, feedback provided to the user may be any form of sensory feedback, such as visual feedback, auditory feedback, or tactile feedback; and input from the user may be received in any form, including acoustic, speech, or tactile input.

The systems and techniques described herein may be implemented in a computing system that includes a back end component—such as a data server, or that includes a middleware component, such as an application server, or that includes a front end component—such as a client computer having a graphical user interface or a Web browser through which a user can interact with an implementation of the systems and techniques described here, or any combination of such back end, middleware, or front end components. The components of the system can be interconnected by any form or medium of digital data communication, such as a communication network. Examples of communication networks include a LAN, a WAN, and the Internet.

Although FIG. 2 shows example components of computing device 200 and mobile computing device 250, computing device 200 or mobile computing device 250 may include fewer components, different components, additional components, or differently arranged components than depicted in FIG. 2. Additionally or alternatively, one or more components of computing device 200 or mobile computing device 250 may perform one or more tasks described as being performed by one or more other components of computing device 200 or mobile computing device 250.

Figure 3:
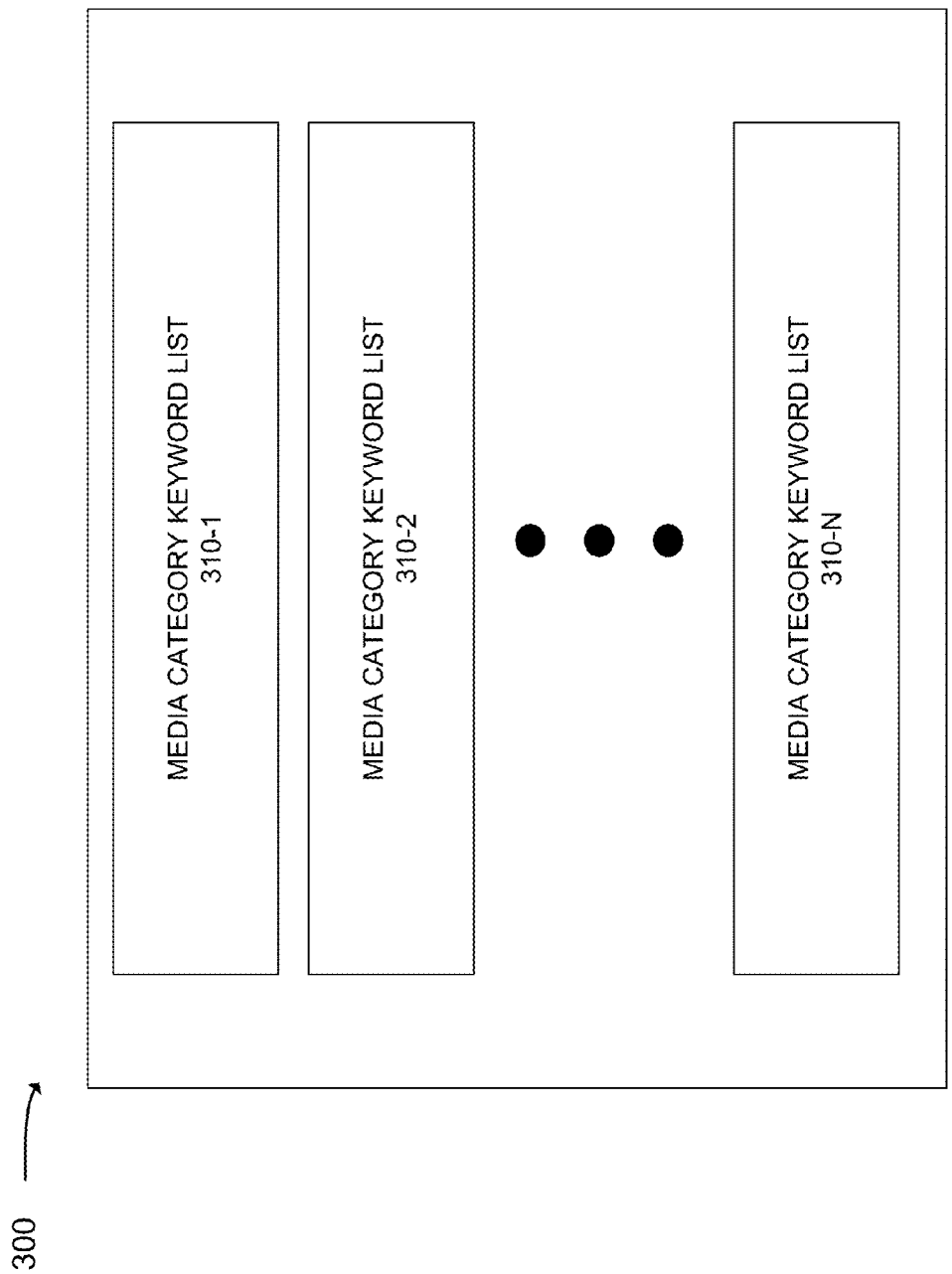
FIG. 3 illustrates an example data structure that stores keyword lists for different media categories.

FIG. 3 illustrates an example data structure 300 that stores keyword lists for different media categories. Search engine system 120 may generate data structure 300, and may store data structure 300 in media keyword lists data store 139. As shown in FIG. 3, data structure 300 may include media category keyword lists 310-1, 310-2, . . . , 310-N, herein collectively referred to as "media category keyword lists 310" and individually as "media category keyword list 310."

Each one of media category keyword lists 310 may correspond to a different media category associated with a particular type of media. For example, media category keyword lists 310-1 may correspond to movies, media category keyword lists 310-2 may correspond to books, media category keyword lists 310-3 may correspond to music, media category keyword lists 310-4 may correspond to TV shows, etc.

Media category keyword list 310 may include one or more keywords associated with a particular media category. Further to the example above, media category keyword lists 310-1 may include, for example, "DVD," "movies," and/or one or more other keywords associated with movies; media category keyword lists 310-2 may include, for example, "hardcover," "bestsellers," "book," and/or one or more other keywords associated with books; media category keyword lists 310-3 may include, for example, "CD," "song," and/or one or more other keywords associated with music; media category keyword lists 310-4 may include, for example, "premium channels," "sitcom," and/or one or more other keywords associated with TV shows; etc.

Figure 4:
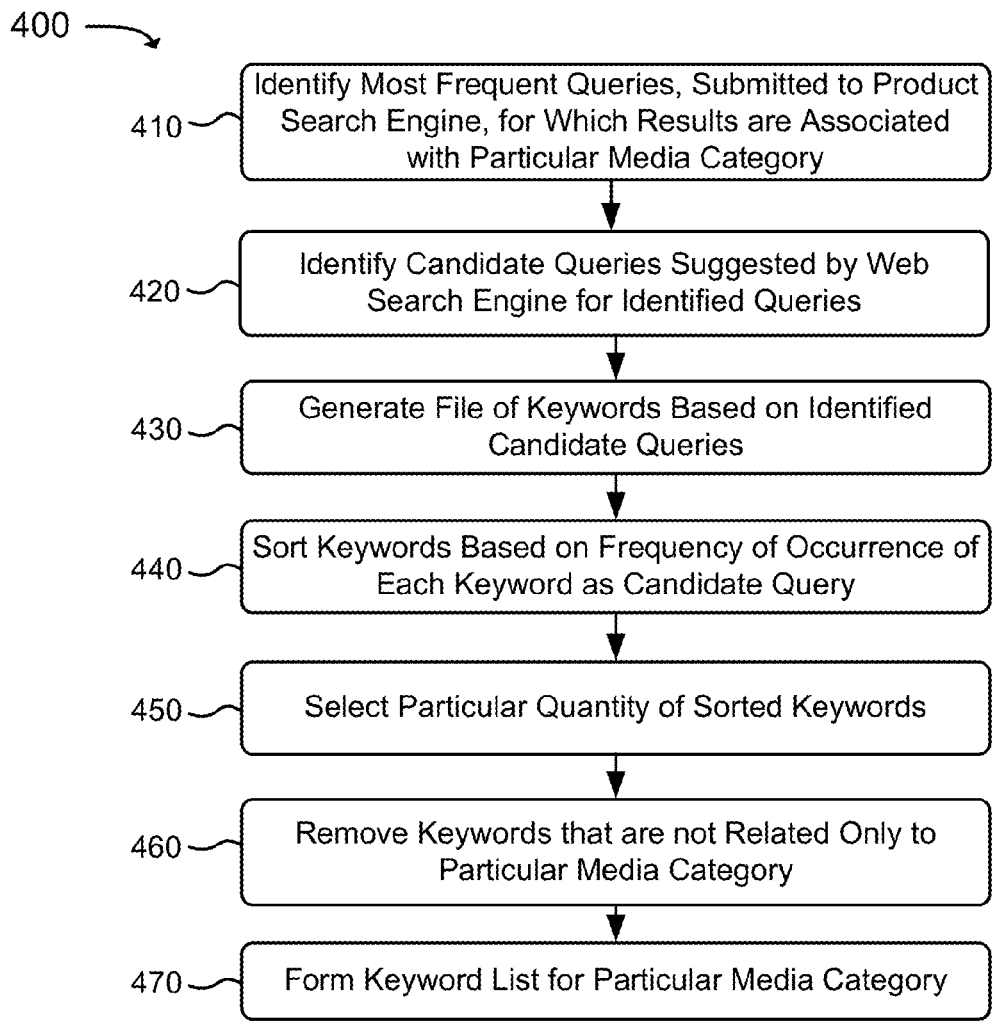
FIG. 4 is a flowchart illustrating an example process for forming a keyword list for a media category.

FIG. 4 is a flowchart illustrating an example process 400 for forming a keyword list for a media category. In some implementations, search engine system 120 may perform process 400. In some implementations, one or more other devices, separate from, or in combination with, search engine system 120, may perform some or all of process 400. Process 400 may repeat for each type of media category.

As shown in FIG. 4, process 400 may include identifying most frequent queries, submitted to a products search engine, for which results are associated with a particular media category (block 410). For example, search engine system 120 may identify, based on information stored in query data store 131 and products search data store 137, a particular quantity of most frequent queries, submitted to the products search engine, for which results are associated with a particular media category, such as movies. The most frequent queries may include, for example, a title of a first movie, a title of a second movie, names of actors that are in a third movie, etc.

Process 400 may further include identifying candidate queries suggested by a web search engine for the identified queries (block 420). For example, search engine system 120 may identify, based on information stored in candidate queries data store 133, a particular quantity of candidate queries, for each one of the identified queries. The candidate queries may include, for example, "cast," "movie," "DVD," "quotes," etc.

Process 400 may also include generating a file of keywords based on the identified candidate queries (block 430). For example, search engine system 120 may generate a file of keywords based on the identified candidate queries. The file of keywords may include each unique keyword that is included in the identified candidate queries.

Process 400 may also include sorting the keywords based on frequency of occurrence of each of the keywords as one of the identified candidate queries (block 440). For example, after generating the file of keywords, search engine system 120 may sort the keywords based how frequently each one of the keywords is repeated in the identified candidate queries. For example, search engine system 120 may sort the keyword "movie" ahead of the keyword "cast" when the keyword "movie" is included in the identified candidate queries a greater quantity of times than the keyword "cast."

Process 400 may also include selecting a particular quantity of the sorted keywords (block 450). For example, after sorting the keywords, search engine system 120 may select a particular quantity of the most-frequent keywords of the sorted keywords.

Process 400 may also include removing keywords that are not related only to the particular media category (block 460). For example, search engine system 120 may remove, from the selected keywords, words that are not related only to the particular media category. The removed keywords may include stop words and/or other words that may be identified as keywords for other media categories that are different from the particular media category. The stop words may include a list of words that are likely irrelevant for determining whether a query is a media query, such as "is," "the," "and," "there," "here," etc. The other words may include words such as "release," "disc," etc.

Process 400 may also include forming a keyword list for the particular media category (block 470). For example, after removing the keywords that are not related only to the particular media category, search engine system 120 may form media category keyword list 310 for the particular media category. Media category keyword list 310 may include all keywords that have not been removed from the selected keywords. For example, when the particular media category is movies, media category keyword list 310 may include "video," "blu-ray," "movie," "DVD," "HD," "3D," etc. as keywords. Search engine system 120 may store media category keyword list 310 in media category lists data store 139.

Figure 5A:
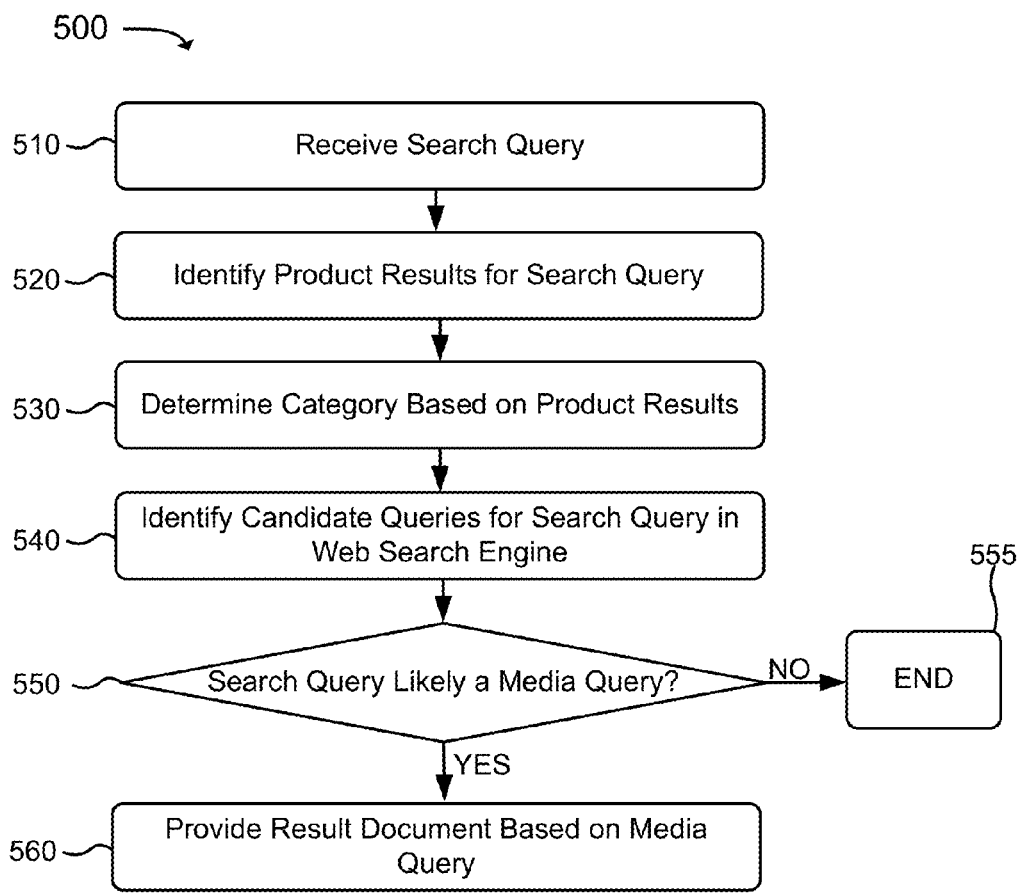
FIGS. 5A-5C are flowcharts illustrating example processes for determining whether a search query is likely to be a media query.

FIG. 5A is a flowchart illustrating an example process 500 for determining whether a search query is likely to be a media query. In some implementations, search engine system 120 may perform process 500. In some implementations, one or more other devices, separate from, or in combination with, search engine system 120, may perform some or all of process 500.

As shown in FIG. 5A, process 500 may include receiving a search query (block 510). For example, a user of user device 110 may use a web search engine interface to submit a search query to search engine system 120. Search engine system 120 may receive the search query.

Process 500 may further include identifying product results for the search query (block 520). For example, search engine system 120 may identify product results that are responsive to the search query based on the products search index of products search data store 137.

Process 500 may also include determining a category based on the product result (block 530). In one example, each one of the product results may include a type of item associated with the product result. For example, when the product is a media item, the type of item may include a type of the media item, such as video, music, book, TV show, etc. Search engine system 120 may determine a category based on the product results. In some implementations, search engine system 120 may select the category that is associated with a highest-ranked product result of the product results. The category, such as movies, may uniquely correspond to the type of item of the product result. In some implementations, search engine system 120 may select the category that is associated with a greatest quantity of top X, where X≥1, results of the product results. For example, search engine system 120 may select the category books when the book type is associated with four of the top six product results.

In another example, each of the product results may include a category score that matches a score of the product result, such as information retrieval score, a link-based score, etc. For example, assume that the product results include four different results, including a first result associated with a music category, a second result associated with a TV show category, a third result associated with the TV show category, and a fourth result associated with a movie category. Further assume that a category score of 0.7 is associated with the first result, a category score of 0.6 is associated with the second result, a category score of 0.5 is associated with the third result, and a category score of 0.4 is associated with the fourth result.

In some implementations, search engine system 120 may select the category that is associated with the highest category score of the product results. Further to the previous example, search engine system 120 may select the music category because the score 0.7, associated with the first product result, is higher than any other score identified for the product results. In some implementations, search engine system 120 may calculate a total score for each of the categories that are associated with the product results. Search engine system 120 may select the category that is associated with the greatest total score. Further to the previous example, search engine system 120 may calculate a total score of 0.7 for the music category, a total score of 1.1 for the TV show category, and a total score of 0.4 for the movie category. Accordingly, search engine system 120 may select the TV show category because the total score of 1.1 is greater than the other total scores. In some implementations, search engine system 120 may determine one or more categories associated with the product results. Search engine system 120 may perform the rest of process 500 for each one of the categories, as described further below.

Process 500 may also include identifying candidate queries for the search query in a web search engine (block 540). For example, search engine system 120 may identify, based on information stored in candidate queries data store 133, candidate queries that are suggested for the search query when users enter the search query into the web search engine interface of search engine system 120.

Process 500 may also include determining whether the search query is likely to be a media query (block 550). For example, search engine system 120 may determine whether the query is likely to be a media query based on terms in the search query, the category, media category keyword list 310 that is associated with the category, the candidate queries, and/or one or more other types of information associated with the search query. In one example, at any point after receiving the search query (block 510), search engine system 120 may determine whether one or more words in the search query match one or more words in one of media category keyword lists 310. Search engine system 120 may identify the search query as a media query or a possible media query of a media type specified by a category associated with one of media category keyword lists 310 when the one or more words in the search query match the one or more words in one of media category keyword lists 310. Additionally, or alternatively, search engine system 120 may use one or more processes that are described below with reference to FIGS. 5B, 5C, and 6-8 to determine the whether the query is likely to be a media query.

If the search query is likely to be a media query (block 550—YES), process 500 may include providing a result document based on the media query (block 560). For example, when search engine system 120 determines that the search query is likely to be a media query, search engine system 120 may output results based on the media query. In some implementations, assume that third parties, such as merchants, pay an operator of search engine system 120 to advertise products to users when a search query, submitted by the users, is of the type of media identified by the category. Search engine system 120 may create, store, and/or have access to entries for the products. Each one of the entries may include, for example, a link to a web page, and/or other information, associated with one of the products that are of a same type as the type of media. Search engine system 120 may identify one or more of the entries based on the type of media and/or the search query. In some implementations, the identified one or more entries may include links to web pages for purchasing the item associated with the search query.

Search engine system 120 may generate a media item result document based on the identified entries. The media item result document may include information from one or more of the entries. Search engine system 120 may include the media item result document as part of a search result document generated for the search query. Search engine system 120 may transmit the search result document to user device 110. The user may select a link in the media item result document, which is part of the search result document, to access the web page associated with the product that is of the same type as the type of media identified for the search query.

If the search query is not likely to be a media query (block 550—NO), process 500 may end (block 555). For example, when search engine system 120 determines that the search query is not likely to be a media query, search engine system 120 may end process 500. Thus, search engine system 120 may provide a search results document that does not include a media item result document.

In some instances, search engine system 120 may identify that a search query is associated with multiple possible types of media queries. Search engine system 120 may perform all or one or more portions of process 500 for each one of the categories associated with the multiple possible types. For example, search engine system 120 may identify that the search query "Jurassic Park" is a possible media query associated with a movie media type or a book media type. When that occurs, search engine system 120 may not provide a media item result document or may provide a media item result document that is based on both types of media items.

Figure 5B:
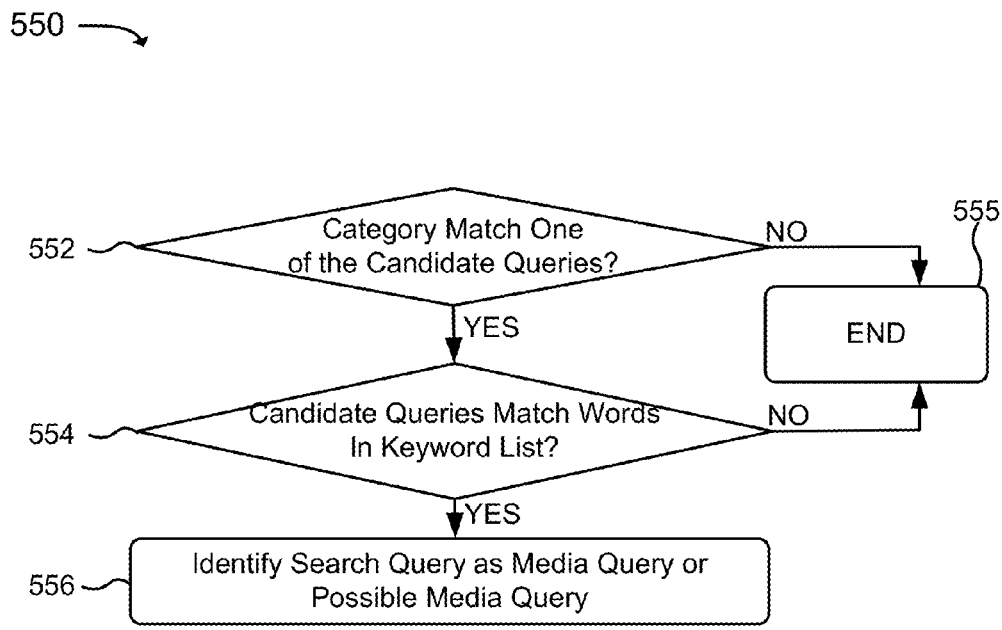

In some implementations, block 550 of process 500 may include one or more of the process blocks depicted in FIG. 5B. In one example, as shown in FIG. 5B, block 550 may include determining whether the category matches one of the candidate queries (block 552). For example, search engine system 120 may determine whether the category matches one of the candidate queries. Search engine system 120 may determine that the category matches one of the candidate queries, when one or more words included in one of the candidate queries, such as "movie," are identical or similar to one or more words included in the category, such as "movies." Search engine system 120 may determine that words are similar when the words share the same root. For example, search engine system 120 may determine that the words "movie" and "movies" are similar because both words share the root "movie." Additionally, or alternatively, search engine system 120 may determine that words are similar when the words are synonyms. Additionally, or alternatively, determining whether the category matches one of the candidate queries may include determining whether the category matches one or more terms of the search query.

If the category matches one of the candidate queries (block 552—YES), block 550 may include determining whether the candidate queries match words in a keyword list (block 554). For example, when search engine system 120 determines that the category matches one of the candidate queries, search engine system 120 may retrieve media category keyword list 310 that is associated with the category. Search engine system 120 may determine whether the candidate queries match words in media category keyword list 310. In some implementations, search engine system 120 may determine that the candidate queries match the words in media category keyword list 310 when a quantity, such as 3, of matching words, which are included as both part of the candidate queries and the words in media category keyword list 310, is greater than or equal to a particular threshold, such as 2. Search engine system 120 may determine the particular threshold based on, for example, a quantity of the candidate queries and/or a quantity of the words in media category keyword list 310. Additionally, or alternatively, determining whether the candidate queries match words in the keyword list may include determining whether one or more terms of the search query match words in the keyword list.

In some implementations, certain words in media category keyword list 310 may be weighted differently than other words in media category keyword list 310. For example, assume that media category keyword list 310 corresponds to a media category associated with movies. Further assume that media category keyword list 310 includes the word "cast" and the word "DVD." Also assume that, in media category keyword list 310, the word "cast" is assigned a weight value of 0.4 and the word "DVD" is assigned a weight value of 1.5. Search engine system 120 may add weight values of words in media category keyword list 310 that match words included in the candidate queries. Search engine system 120 may determine that the candidate queries match the words in media category keyword list 310 when a sum of the added values is greater than a particular threshold, such as 2, associated with, for example, media category keyword list 310.

If the category does not match one of the candidate queries (block 552—NO) and/or the candidate queries do not match the words in the keyword list (block 554—NO), process 500 may end (block 555). For example, when search engine system 120 determines that the category does not match one of the candidate queries and/or when search engine system 120 determines that the candidate queries do not match the words in media category keyword list 310, search engine system 120 may not identify the search query as a media query, and may end process 500.

If the candidate queries match the words in the keyword list (block 552—YES), process 500 may include identifying the search query as a media query or a possible media query (block 556). In some implementations, when search engine system 120 determines that the candidate queries match the words in the keyword list, search engine system 120 may identify the search query as a media query of a type of media specified by the category. In some implementations, when search engine system 120 determines that the candidate queries match the words in the keyword list, search engine system 120 may identify the search query as a media query or a possible media query based on a type of the media specified by the category. When search engine system 120 identifies the search query as a possible media query, search engine system 120 may need to perform one or more other processes to verify that the search query is a media query of the type of the media specified by the category before being able to identify the search query as the media query. To do so, search engine system 120 may perform one or more other processes, such as those described below with reference to FIGS. 6-8, based on the type of the media identified by the category.

In one example, search engine system 120 may first identify the search query as the possible media query, as opposed to first identifying the search query as the media query, based on the type of the media specified by the category. For example, assume that an operator of search engine system 120 determines that for particular types of media, additional verification is required, in addition to process 500, before a search query is identified as a media query of one of the particular types. The particular types may include types for which the operator determines that process 500, alone, is not enough to identify a search query as a media query of one of the particular types with sufficient certainty. In other words, the operator may determine that process 500 is likely to incorrectly determine that search queries are associated with the particular types more than an acceptable amount of times. When the type of the media is one of the particular types, search engine system 120 may identify the search query as a possible media query.

Figure 5C:
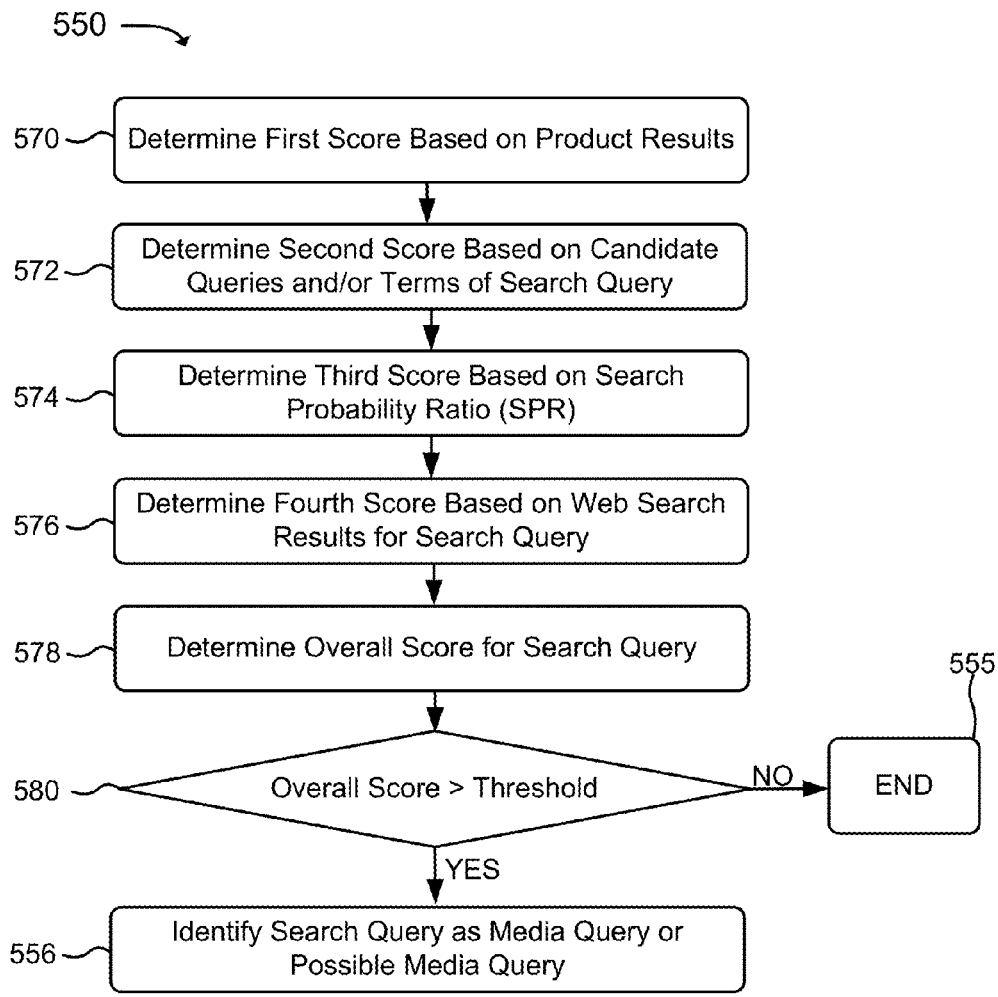

Additionally, or alternatively, block 550 of process 500 may include one or more of the process blocks depicted in FIG. 5C. As shown in FIG. 5C, block 550 may include determining a first score based on the product results (block 570). For example, search engine system 120 may select a particular quantity, such as five, of the product results as top product results. In one example, search engine system 120 may determine a quantity of the top product results that are associated with the category. Search engine system 120 may determine a first score, such as a value between 0 and 1, based on the quantity. For example, when the quantity of the top product results that are associated with the category is equal to the particular quantity of the top product results, search engine system 120 may determine a value of 1 for the first score. In another example, one or more of the top product results may be associated with a category score for the category, as described above with reference to block 530 of FIG. 5A. Search engine system 120 may determine a first score based on an average of category scores associated with the top product results. Search engine system 120 may use a value of 0 for a category score of a product result when the product result does not have a category score for the category. For example, search engine system 120 may determine a value of 0.5 for the first score based on the following category scores for five top product results: 0; 0.4; 1.0; 0.0.4; and 0.7.

Block 550 may further include determining a second score based on the candidate queries and/or the terms of the search query (block 572). For example, search engine system 120 may determine whether the category matches the candidate queries and/or the terms of the search query, as described above with reference to block 552 of FIG. 5B. Search engine system 120 may determine a category match score based on a quantity of the candidate queries and/or the terms of the search query that match the category. Additionally, or alternatively, search engine system 120 may determine whether the candidate queries and/or the terms of the search query match words in the keyword list associated with the category, as described above with reference to block 554 of FIG. 5B. Search engine system 120 may determine a keyword list match score based on a quantity of the candidate queries and/or the terms of the search query that match the category and/or based on which particular words on the keyword list match the candidate queries and/or the terms of the search query. For example, search engine system 120 may use the weight values associated with the particular words on the keyword list to calculate the keyword list match score. Search engine system 120 may determine a second score, such as a value between 0 and 1, based on the category match score and/or the keyword list match score.

Block 550 may also include determining a third score based on a search probability ratio (SPR) (block 574). For example, search engine system 120 may determine an SPR for the search query, as described below with reference to FIG. 6. Search engine system 120 may determine the third score based on the SPR. In one example, a value of the third score may equal a value of the SPR. In another example, the value of the third score may equal a normalized value of the SPR.

Block 550 may also include determining a fourth score based on web search results for the search query (block 576). For example, search engine system 120 may submit the search query to search engine system 120. Search engine system 120 may retrieve web search results that are responsive to the search query. Search engine system 120 may determine a fourth score based on the web search results. In one example, search engine system 120 may store top-level domains of co-occurring websites for the category. Co-occurring websites are known to one or more websites that are known to be included in search results that are responsive to search queries that are media queries associated with the category. For example, search engine system 120 may store top-level domain www.imdb.com and top-level domain www.rottentomatoes.com for the category that specifies the movie media type. Search engine system 120 may determine whether any of the web search results are associated with the co-occurring websites based on the top-level domains associated with the category. Search engine system 120 may determine the fourth score base on whether any of the web search results are associated with the co-occurring websites. For example, search engine system 120 may determine for, the fourth score, a value of 1.0 when at least two of the web search results are associated with the co-occurring websites, a value of 0.5 when only one of the web search results is associated with the co-occurring websites, or a value of 0 when none of the web search results are associated with the co-occurring websites.

Block 550 may also include determining an overall score (block 578). For example, search engine system 120 may determine an overall score based on the first score, the second score, the third score, the fourth score, and/or one or more other scores. The one or more other scores may be determined based on the search query, the product results, the category, the candidate queries, and/or one or more other types of information, associated with the search query, such as those described below with reference to FIGS. 7 and 8. In one example, the overall score may equal a sum of the first score, the second score, the third score, the fourth score, and/or the one or more other scores. In another example, the overall score may equal an average of the first score, the second score, the third score, the fourth score, and/or the one or more other scores. In some implementations, the overall score may equal a weighted sum of the first score, the second score, the third score, the fourth score, and/or the one or more other scores. The first score, the second score, the third score, the fourth score, and/or the one or more other scores may be weighed differently from one another before calculating the weighed sum. In some implementations, the first score, the second score, the third score, the fourth score, and/or the one or more other scores may be weighed differently from one another when calculating the average.

Block 550 may also include determining whether the overall score is greater than a threshold (block 580). For example, search engine system 120 may determine whether the overall score is greater than a threshold.

If the overall score is greater than the threshold (block 580—YES), block 550 may include identifying the search query as a media query or a possible media query (block 556). For example, when search engine system 120 determines that the overall score is greater than the threshold, search engine system 120 may identify the search query as a media query or a possible media query of a type of media specified by the category, as described above with reference to block 556 of FIG. 5B.

If the overall score is not greater than the threshold (block 580—NO), block 550 may end (block 555). For example, when search engine system 120 determines that the overall score is not greater than the threshold, search engine system 120 may transmit a message, which indicates that the search query has not been identified as a media query, as described above with reference to block 555 of FIG. 5A.

In some implementations, as described above, block 550 of process 500 may include a combination of one or more of the process blocks depicted in FIG. 5B and of one or more of the process blocks depicted in FIG. 5C. In one example, search engine system 120 may identify the search query as a media query only when the candidate queries and/or the terms of the search query match words in the keyword list (block 554 of FIG. 5B) and the overall score is greater than the threshold (block 580 of FIG. 5C). In another example, search engine system 120 may identify the search query as a possible media query when the category matches one of the candidate queries or one of the terms of the search query (block 552 of FIG. 5B) and a particular score, such as the fourth score (block 576 of FIG. 5C), is less than a first threshold and/or greater than a second threshold. Search engine system 120 may identify the search query as a media query, as opposed to a possible media query, when the category matches one of the candidate queries or one of the terms of the search query (block 552 of FIG. 5B) and the particular score is greater than the first threshold.

Figure 6:
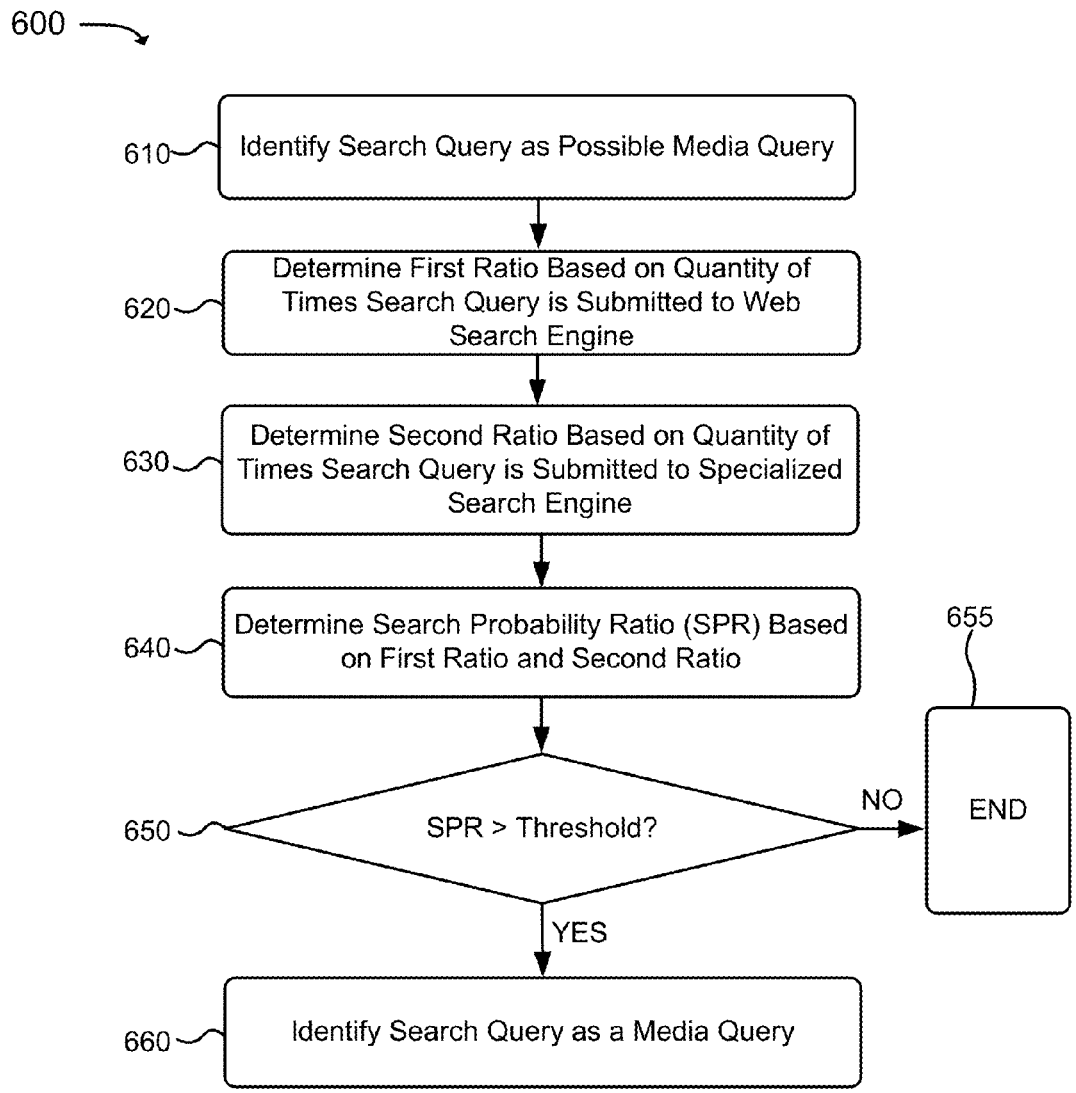
FIG. 6 is a flowchart illustrating an example process for identifying a search query as a media query.

FIG. 6 is a flowchart illustrating an example process 600 for identifying a query as a media query. In some implementations, search engine system 120 may perform process 600. In some implementations, one or more other devices, separate from, or in combination with, search engine system 120, may perform some or all of process 600. Block 550 of FIG. 5A, or particularly block 556 of FIG. 5B or FIG. 5C, may include process 600.

As shown in FIG. 6, process 600 may include identifying a search query as a possible media query (block 610). For example, search engine system 120 may identify a search query as a possible media query, as discussed above with reference to block 556 of FIG. 5B. Search engine system 120 may perform process 600 when the search query is a possible media query of a particular media type, such as books, to verify that the search query is likely a media query of the particular media type.

Process 600 may further include determining a first ratio based on a quantity of times that the search query is submitted to a web search engine (block 620). For example, a first ratio may equal a first quantity of times that the search query is submitted to search engine system 120 to a web search engine interface, during a particular period of time, such as the last 24 hours, divided by a second quantity of all search queries that are submitted to search engine system 120 to the web search engine interface, during the particular period of time. Search engine system 120 may determine the first quantity and the second quantity based on information stored in query data store 131, and may determine the first ratio based on the first quantity and the second quantity.

Process 600 may also include determining a second ratio based on a quantity of times that the search query is submitted to a specialized search engine (block 630). Assume that search engine system 120 includes a book search engine that is used to search for information associated with books. Further assume that data store 130 includes a book search data store that includes a book search index that is used, by search engine system 120, to identify results that are responsive to queries that are submitted to a book search engine interface. For example, a second ratio may equal a third quantity of times that the search query is submitted to a specialized search engine, such as the book search engine, during a particular period of time, divided by a fourth quantity of all search queries are submitted to the specialized search engine, during the particular period of time. Search engine system 120 may determine the third quantity and the fourth quantity based on information stored in query data store 131, and may determine the second ratio based on the third quantity and the fourth quantity.

Process 600 may also include determining a search probability ratio (SPR) based on the first ratio and the second ratio (block 640). For example, search engine system 120 may determine an SPR based on the first ratio and the second ratio. The SPR may equal a result of dividing the second ratio by the first ratio.

Process 600 may also include determining whether the SPR is greater than a threshold (block 650). For example, search engine system 120 may determine whether the SPR is greater than a threshold.

If the SPR is greater than the threshold (block 650—YES), process 600 may include identifying the search query as a media query (block 660). For example, when search engine system 120 determines that the SPR is greater than the threshold, search engine system 120 may identify the search query as the media query, as opposed to the possible media query, as described above with reference to block 556 of FIG. 5B. Further to the example above, search engine system 120 may identify that the search query is likely associated with the books type of media.

If the SPR is not greater than the threshold (block 650—NO), process 600 may end (block 655). For example, when search engine system 120 determines that the SPR is less than or equal to the threshold, search engine system 120 may end process 600 and/or any other related processes that are being used to determine whether the search query is a media query, as described above with reference to block 555 of FIG. 5A.

In some implementations, search engine system 120 may perform a process similar to process 600 when the type of media is movies or one of the other types of media. Search engine system 120 may include components for a news search engine, the first ratio may be based on a quantity of times that the search query is submitted to the web search engine interface, and the second ratio may be based on a quantity of times that the search query is submitted to the news search engine. After search engine system 120 determines SPR based on the first ratio and the second ratio, search engine system 120 may determine whether the SPR is less than a particular threshold. When the SPR is less than the particular threshold, search engine system 120 may identify the search query as of a purchasable movie type of media because the search query is likely related to an older version of a movie. When the ratio is greater or equal to the particular threshold, search engine system 120 may not identify the search query as of the purchasable movie type of media because the search query is likely related to a new version of the movie that is still in theaters and not available for purchase as a media item. In some implementations, a value of the particular threshold may vary based on the type.

Figure 7:
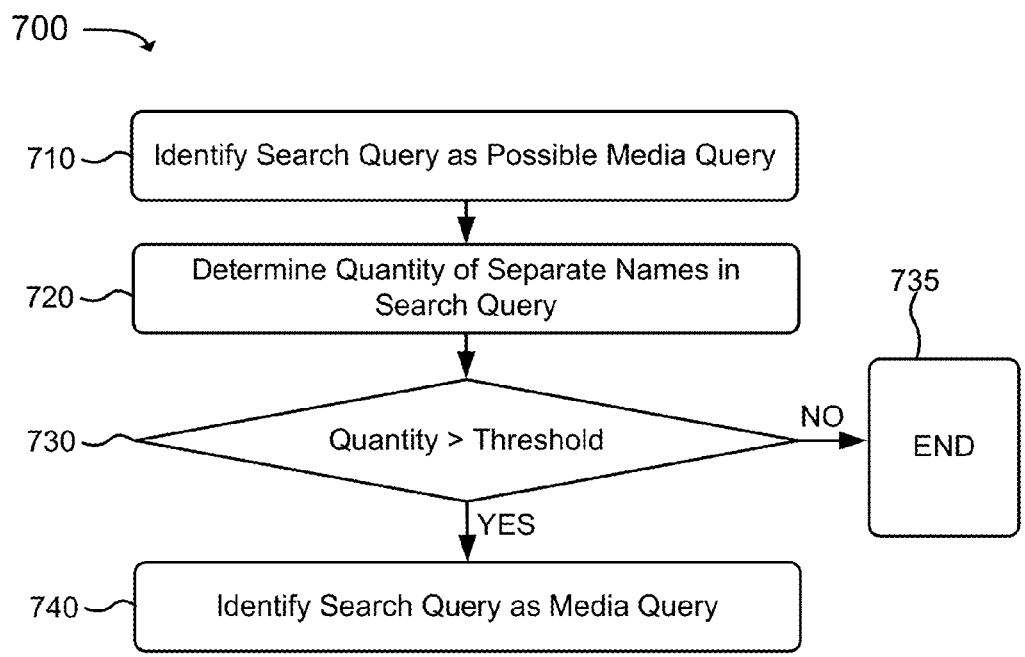
FIG. 7 is a flowchart illustrating another example process for identifying a search query as a media query.

FIG. 7 is a flowchart illustrating another example process 700 for identifying a search query as a media query. In some implementations, search engine system 120 may perform process 700. In some implementations, one or more other devices, separate from, or in combination with, search engine system 120, may perform some or all of process 700. Block 550 of FIG. 5A, or particularly block 556 of FIG. 5B or FIG. 5C, may include process 700.

As shown in FIG. 7, process 700 may include identifying a search query as a possible media query (block 710). For example, search engine system 120 may identify a search query as a possible media query, as discussed above with reference to block 556 of FIG. 5B. Search engine system 120 may perform process 700 when the search query is a possible media query of a particular media type, such as a movie media type. For example, search engine system 120 may specifically identify the search query as a possible movie media query.

Process 700 may further include determining a quantity of separate names in the search query (block 720). For example, search engine system 120 may use one or more standard techniques for detecting unique names in a string to detect one or more separate names in the search query. In one example, the search query may include "Mel Gibson and Danny Glover." Search engine system 120 may detect a first separate name "Mel Gibson" and a second separate name "Danny Glover" in the search query. Search engine system 120 may determine a quantity of the separate names in the query.

Process 700 may also include determining whether the quantity is greater than a threshold (block 730). For example, assume that search engine system 120 determines that the quantity is equal to two, and that a threshold is equal to one. In this example, search engine system 120 may determine whether the quantity, such as two, is greater than threshold, such as one.

If the quantity is greater than the threshold (block 730—YES), process 700 may include identifying the search query as a movie media query (block 740). For example, when search engine system 120 determines that the quantity is greater than the threshold, search engine system 120 may identify the search query as a media query. Further to the example above, when the search query was previously identified as a possible movie media query, search engine system 120 may identify the search query as a movie media query that is likely associated with the movie type of media.

If the quantity is not greater than the threshold (block 730—NO), process 700 may end (block 735). For example, when search engine system 120 determines that the quantity is not greater than the threshold, search engine system 120 may end process 700 and/or any other related processes that are being used to determine whether the search query is a media query, as described above with reference to block 555 of FIG. 5A.

Figure 8:
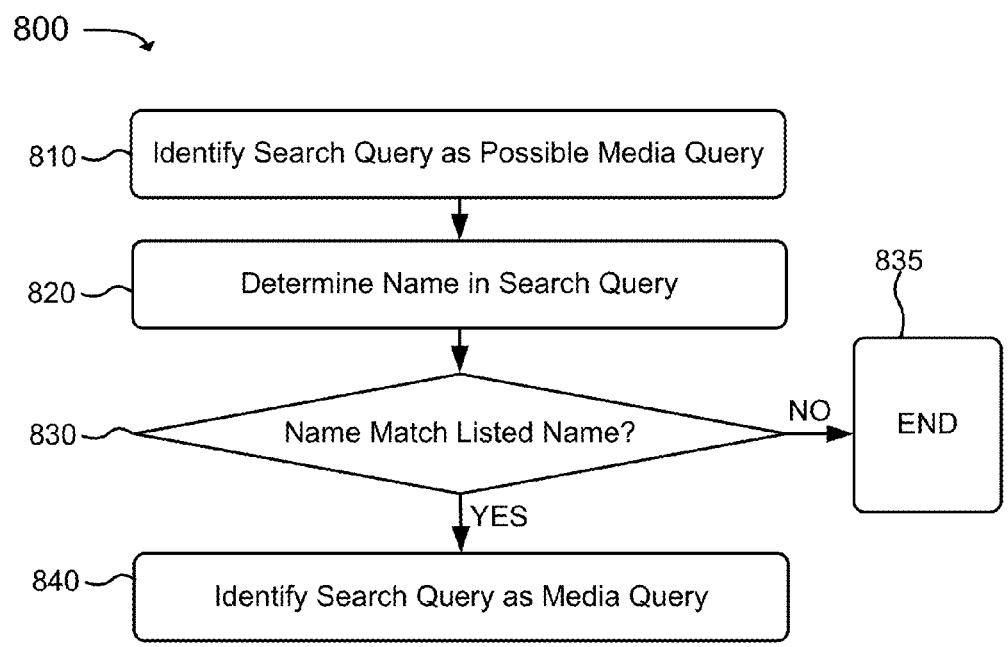
FIG. 8 is a flowchart illustrating yet another example process for identifying a search query as a media query.

FIG. 8 is a flowchart illustrating yet another example process 800 for identifying a search query as a media query. In some implementations, search engine system 120 may perform process 800. In some implementations, one or more other devices, separate from, or in combination with, search engine system 120, may perform some or all of process 800. Block 550 of FIG. 5A, or particularly block 556 of FIG. 5B or FIG. 5C, may include process 800.

As shown in FIG. 8, process 800 may include identifying a search query as a possible media query (block 810). For example, search engine system 120 may identify a search query as a possible media query, as discussed above with reference to block 556 of FIG. 5B. Search engine system 120 may perform process 800 when the search query is a possible media query of a particular media type, such as a music media type. For example, search engine system 120 may specifically identify the search query as a possible music media query.

Process 800 may further include determining a name in the search query (block 820). For example, search engine system 120 may use one or more known name detection techniques that are used to detect unique names in a string. In some implementations, a name detection technique may include using a name classifier that detects name(s) in search queries. The name classifier may be trained with training data that includes multiple names and/or queries that include names. Based on the training data and information associated with the training data, such as behavior information of users who receive search results based on the training data, the name classifier may formulate and/or refine rules for detecting names in search queries. The name classifier may use the rules to detect names in search queries. In one example, the search query may include "Dave Mathews." As a result, search engine system 120 may detect the name "Dave Mathews" in the search query.

Process 800 may also include determining whether the name matches a listed name (block 830). For example, search engine system 120 may store or have access to a list of names, such as a list of band names. Search engine system 120 may determine whether the name matches one of the names on the list.

If the name matches the listed name (block 830—YES), process 800 may include identifying the search query as a media query (block 840). For example, when search engine system 120 determines that the name matches the band name, search engine system 120 may identify the search query as a media query. For example search engine system 120 may determine that the name "Dave Mathews" matches the band name "Dave Mathews" on the list. When search engine system 120 determines that the name matches the band name, search engine system 120 may identify the search query as a music media query that is likely associated with the music type of media.

If the name does not match a listed name (block 830—NO), process 800 may end (block 835). For example, search engine system 120 may determine that the name does not match any name on the list. When search engine system 120 determines that the name does not match a listed name, search engine system 120 may end process 800 and/or any other related processes that are being used to determine whether the search query is a media query, as described above with reference to block 555 of FIG. 5.

Figure 9A:
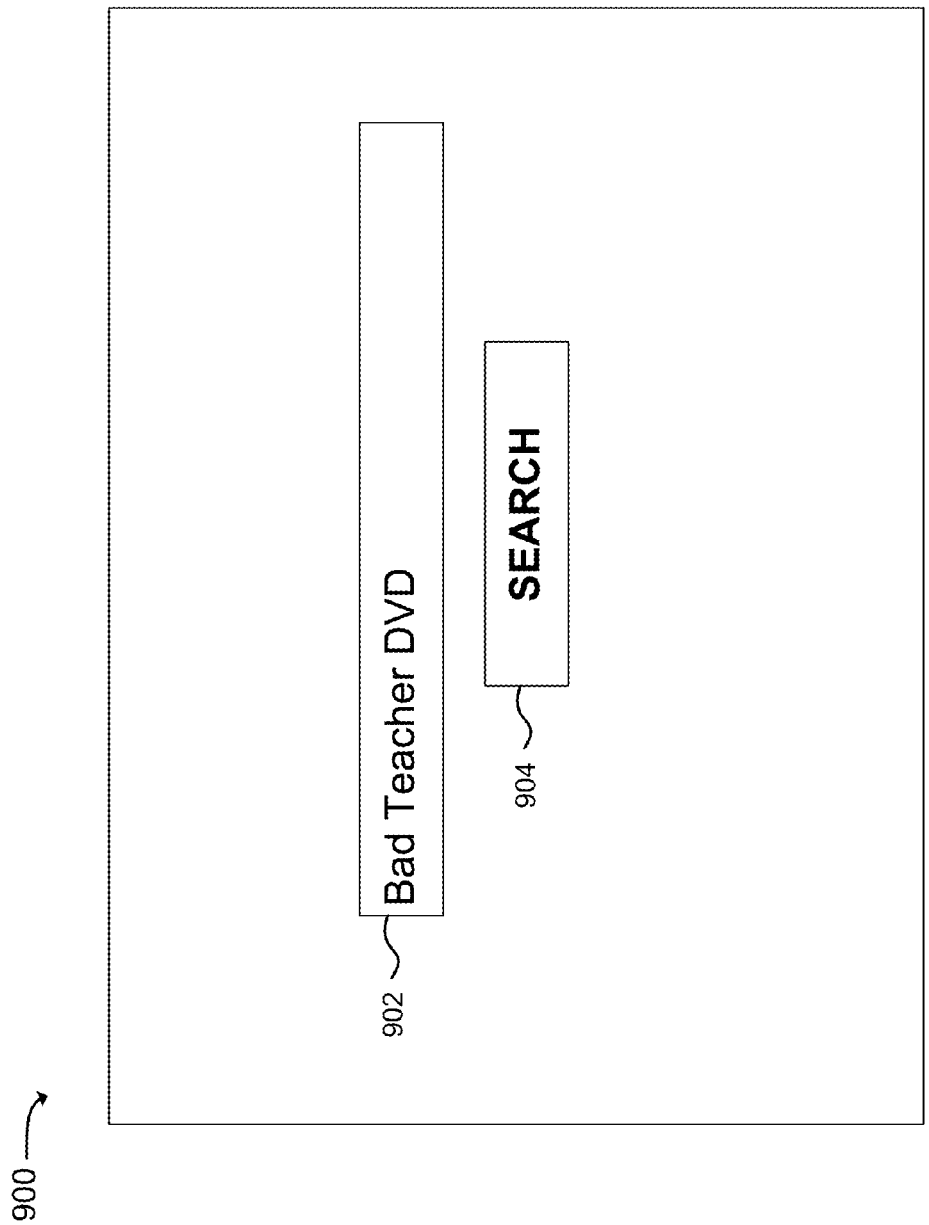
FIGS. 9A and 9B illustrate an example of providing a media item result document when a search query is identified as a media query.
Figure 9B:
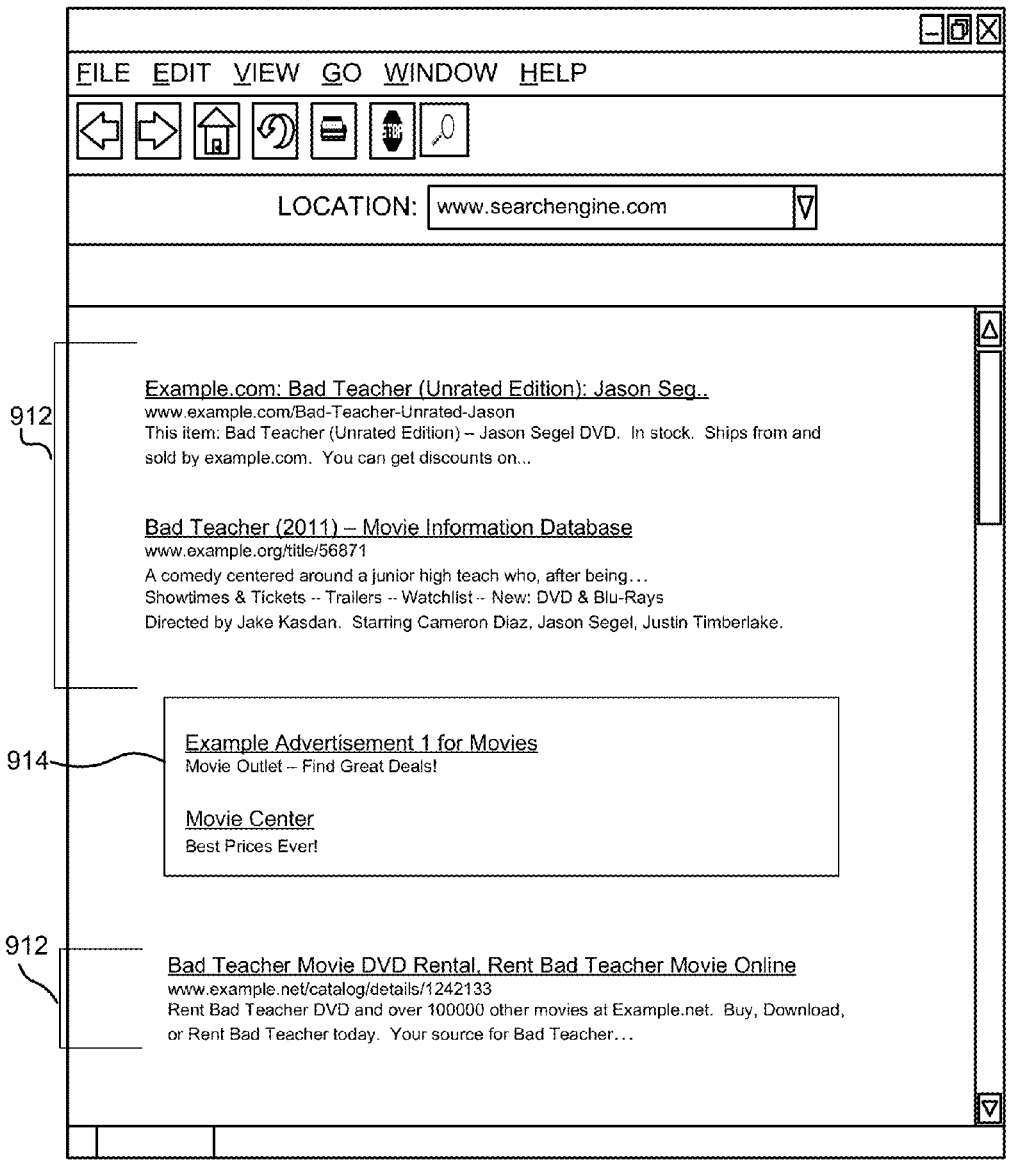

FIGS. 9A and 9B illustrate an example of providing a media item result document when a search query is identified as a media query. FIG. 9A illustrates an example user interface 900 of a web search engine of search engine system 120 that is used to receive a search query. As shown in FIG. 9A, user interface 900 may include a text entry field 902 and a search button 904. Assume that a user of user device 110 enters a search query "Bad Teacher DVD" into text entry field 902 of user interface 900, and that the user selects search button 904 after entering the search query "Bad Teacher DVD." When the user selects search button 904, user device 110 may transmit the search query "Bad Teacher DVD" to search engine system 120.

Search engine system 120 may identify product results, for the search query "Bad Teacher DVD," based on the products search index of products search data store 137. Search engine system 120 may further retrieve candidate queries, for the search query "Bad Teacher DVD," from candidate queries data store 133. Search engine system 120 may identify the search query "Bad Teacher DVD" as a media query that is associated with a movie type of media items based on the product results, the candidate queries, the search query "Bad Teacher DVD," and/or one or more other types of information, associated with the search query, such as those described above.

Assume that online merchants, Movie Outlet and Movie Center, pay an operator of search engine system 120 to advertise their web pages when users enter search queries that are identified as media queries that are associated with the movie type of media items. Further assume that online merchant DVD Retailer pays the operator to advertise their web page for purchasing a DVD of the "Bad Teacher" movie when users enter search queries that are identified as media queries that are associated with the movie type of media items and include the term(s) "Bat Teacher." Assume that search engine system 120 stores or has access to a first entry that includes information for a web page of Movie Outlet, a second entry that includes information for a web page of Movie Center, and a third entry that includes information for the web page of DVD Retailer. Search engine system 120 may identify the first entry, the second entry, and the third entry based on the movie type and/or the search query "Bad Teacher DVD" when the search query "Bad Teacher DVD" is identified as the media query that is associated with the movie type.

FIG. 9B illustrates an example user interface 910 of search engine system 120 that is used to provide search results that are responsive to the search query. As shown in FIG. 9B, user interface 910 may include search results 912 and media item result document 914. Further to the example above, search engine system 120 may generate media item result document 914 based on the first entry and the second entry. Media item result document may include a first link to the web page of Movie Outlet and a second link to the web page of Movie Center. Search engine system 120 may also identify search results 912 that are responsive to the query. Search engine system 120 may include media item result document 914 as part of search results 912. Search engine system 120 may transmit search results 912, including the media item result document 914, to user device 110. User device 110 may display user interface 910, including media item result document 914. The user may select a link to access the web page of Movie Outlet, another link to access the web page of Movie Center, and/or yet another link to access the web page of DVD Retailer.

Systems and/or methods, as described herein, may allow search engine systems to determine when a search query is a media query. As a result, the search engine systems may provide specialized information, in response to the search query, based on a type of media items associated with the search query.

The foregoing description provides illustration and description, but is not intended to be exhaustive or to limit the implementations to the precise form disclosed. Modifications and variations are possible in light of the above teachings or may be acquired from practice of these implementations.

For example, while series of blocks have been described with regard to FIGS. 4-8, the order of the blocks may be modified in some implementations. Further, non-dependent blocks may be performed in parallel. In addition, other blocks may be provided, or blocks may be eliminated, from the described flowcharts, and other components may be added to, or removed from, the described systems.

Also, certain portions of the implementations have been described as a "component" that performs one or more functions. The term "component" may include hardware, such as a processor, an ASIC, or a field programmable gate array (FPGA), or a combination of hardware and software, such as software running on a general purpose processor that creates a specific purpose processor.

It will be apparent that aspects described herein may be implemented in many different forms of software, firmware, and hardware in the implementations illustrated in the figures. The actual software code or specialized control hardware used to implement aspects does not limit the implementations. Thus, the operation and behavior of the aspects were described without reference to the specific software code—it being understood that software and control hardware can be designed to implement the aspects based on the description herein.

It should be emphasized that the term "comprises/comprising," when used in this specification, is taken to specify the presence of stated features, integers, steps, or components, but does not preclude the presence or addition of one or more other features, integers, steps, components, or groups thereof.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   receiving, by one or more devices, a search query;
   identifying, by the one or more devices, candidate queries for the search query;
   identifying, by the one or more devices, a media keyword list;
   identifying, by the one or more devices, the search query as a possible media query based on the candidate queries and the media keyword list;
   determining, by the one or more devices and after identifying the search query as the possible media query, that additional verification is required before the search query is identified as a media query;
   determining, by the one or more devices, that the search query includes one or more names after determining that the additional verification is required;
   identifying, by the one or more devices, the search query as the media query based on determining that the search query includes the one or more names; and
   providing, by the one or more devices, a result document that includes information based on identifying the search query as the media query.

2. The method of claim 1, where identifying the search query as the media query comprises:
   determining a quantity of separate names that are included in the one or more names, and
   identifying the search query as the media query based on the quantity of separate names.

3. The method of claim 2, where identifying the search query as the media query based on the quantity of separate names comprises:
   determining that the quantity of separate names satisfies a threshold, and
   identifying the search query as the media query based on the quantity of separate names satisfying the threshold.

4. The method of claim 1, where identifying the search query as the possible media query comprises:
   identifying the search query as the possible media query of a movie media type.

5. The method of claim 1, where identifying the search query as the possible media query comprises:
   determining product search results based on the search query,
   determining a category associated with a set of results of the product search results, and
   identifying the search query as the possible media query based on the candidate queries, the media keyword list, and the category.

6. The method of claim 5, where identifying the search query as the possible media query comprises:
   determining that the category matches one of the candidate queries, and
   identifying the search query as the possible media query based on determining that the category matches one of the candidate queries and based on the media keyword list.

7. The method of claim 1, where the result document includes information identifying one or more products that are of a same type as a type of the media query.

8. The method of claim 1, where identifying the search query as the possible media query based on the candidate queries and the media keyword list comprises:
   determining a quantity of matching words included as part of the candidate queries and the media keyword list,
   determining that the quantity of matching words satisfies a threshold, and
   identifying the search query as the possible media query based on determining that the quantity of matching words satisfies the threshold.

9. A system comprising:
   one or more processors to:
   receive a search query;
   identify candidate queries for the search query;

identify a media keyword list;

identify the search query as a possible media query based on the candidate queries and the media keyword list;

determine, after identifying the search query as the possible media query, that additional verification is required before the search query is identified as a media query;

determine that the search query includes one or more names after determining that the additional verification is required;

identify the search query as the media query based on determining that the search query includes the one or more names; and provide a result document that includes information based on identifying the search query as the media query.

10. The system of claim 9, where, when identifying the search query as the media query, the one or more processors are to:

determine a quantity of the one or more names, and identify the search query as the media query based on the quantity of the one or more names.

11. The system of claim 9, where the one or more names include a particular name of an actor, and where the particular name includes a first name of the actor and a last name of the actor.

12. The system of claim 9, where the result document includes information identifying one or more products that are of a same type as a type of the media query.

13. The system of claim 9, where, when identifying the search query as the possible media query, the one or more processors are to:

determine product search results based on the search query, and identify the search query as the possible media query based on the product search results, the candidate queries, and the media keyword list.

14. The system of claim 9, where, when identifying the search query as the possible media query, the one or more processors are to:

determine web search results that are responsive to the search query, determine domains associated with the web search results, and identify the search query as the possible media query based on the domains, the candidate queries, and the media keyword list.

15. A non-transitory computer-readable medium storing instructions, the instructions comprising:

one or more instructions that, when executed by at least one processor, cause the at least one processor to:

receive a search query;

determine a first score for the search query;

determine a second score for the search query;

determine an overall score for the search query based on the first score and the second score;

determine that the overall score satisfies a threshold;

determine that the search query is a possible media query based on determining that the overall score satisfies the threshold;

determine that the search query includes a quantity of names after determining that the search query is the possible media query;

identify the search query as a media query based on determining that the search query includes the quantity of names; and provide a result document that includes information based on identifying the search query as the media query.

16. The non-transitory computer-readable medium of claim 15, where the one or more instructions to identify the search query as the media query comprise:

one or more instructions that, when executed by the at least one processor, cause the at least one processor to:

determine that the quantity of names satisfies a threshold, and identify the search query as the media query based on the quantity of names satisfying the threshold.

17. The non-transitory computer-readable medium of claim 15, where the one or more instructions to determine the first score comprise:

one or more instructions that, when executed by the at least one processor, cause the at least one processor to:

determine product search results based on the search query, and determine the first score based on the product search results.

18. The non-transitory computer-readable medium of claim 15, where the one or more instructions to determine the second score comprise:

one or more instructions that, when executed by the at least one processor, cause the at least one processor to:

determine a quantity of times that the search query is submitted to a specialized search engine during a particular period of time, and determine the second score based on the quantity of times.

19. The non-transitory computer-readable medium of claim 15, where the result document includes an advertisement for a product of a type associated with the media query.

20. The non-transitory computer-readable medium of claim 15, where the one or more instructions to determine the overall score comprise:

one or more instructions that, when executed by the at least one processor, cause the at least one processor to:

determine an average based on the first score and the second score, and determine the overall score based on the average.

* * * * *